(12) United States Patent
Oda et al.

(10) Patent No.: US 12,384,434 B2
(45) Date of Patent: Aug. 12, 2025

(54) SENSOR PERFORMANCE EVALUATION SYSTEM AND METHOD, AND AUTOMATIC DRIVING SYSTEM

(71) Applicant: HITACHI, LTD., Tokyo (JP)

(72) Inventors: Atsushi Oda, Tokyo (JP); Keiichi Katsuta, Tokyo (JP)

(73) Assignee: HITACHI, LTD., Tokyo (JP)

( * ) Notice: Subject to any disclaimer, the term of this patent is extended or adjusted under 35 U.S.C. 154(b) by 431 days.

(21) Appl. No.: 17/768,292

(22) PCT Filed: Sep. 18, 2020

(86) PCT No.: PCT/JP2020/035592
§ 371 (c)(1),
(2) Date: Apr. 12, 2022

(87) PCT Pub. No.: WO2021/075210
PCT Pub. Date: Apr. 22, 2021

(65) Prior Publication Data
US 2024/0034371 A1    Feb. 1, 2024

(30) Foreign Application Priority Data
Oct. 18, 2019 (JP) .................................. 2019-191535

(51) Int. Cl.
*B61L 23/04* (2006.01)
*B60L 3/00* (2019.01)
(Continued)

(52) U.S. Cl.
CPC .......... *B61L 23/041* (2013.01); *B60L 3/0015* (2013.01); *B60L 3/08* (2013.01); *G01S 13/08* (2013.01);
(Continued)

(58) Field of Classification Search
CPC ........ B61L 23/041; B60L 3/0015; B60L 3/08; B60L 2240/62; G01S 13/08; G01S 13/931; G01S 2013/9328
See application file for complete search history.

(56) References Cited

U.S. PATENT DOCUMENTS

| 11,453,422 B2 * | 9/2022 | Nishino | B60M 1/28 |
| 11,938,983 B2 * | 3/2024 | Tsutsumi | G01C 21/30 |

(Continued)

FOREIGN PATENT DOCUMENTS

| CN | 106364530 A * | 2/2017 | |
| EP | 3492306 A1 * | 6/2019 | B60L 15/40 |

(Continued)

OTHER PUBLICATIONS

Extended European Search Report received in corresponding European Application No. 20875681.7 dated Nov. 6, 2023.

(Continued)

*Primary Examiner* — Jason C Smith
(74) *Attorney, Agent, or Firm* — Mattingly & Malur, PC

(57) ABSTRACT

A recording unit records an installation position of a ground installation object and an installation identifier of the ground installation object for each of a plurality of the ground installation objects installed beside a track on which a vehicle of a track transport system mounted with an external sensor travels; an installation object recognition unit specifies the installation identifier from external sensor information including information detected by the external sensor and recognizes the ground installation object corresponding to the installation identifier by referring to the recording unit; and a detection distance calculation unit calculates a detection distance of the external sensor. The detection distance calculation unit calculates the detection distance of the external sensor from a self-position of the vehicle at which the ground installation object is recognized and the (Continued)

installation position of the ground installation object recognized by the installation object recognition unit.

8 Claims, 6 Drawing Sheets

(51) Int. Cl.
 B60L 3/08 (2006.01)
 G01S 13/08 (2006.01)
 G01S 13/931 (2020.01)
(52) U.S. Cl.
 CPC ......... G01S 13/931 (2013.01); *B60L 2240/62* (2013.01); *G01S 2013/9328* (2013.01)

(56) References Cited

U.S. PATENT DOCUMENTS

| | | | | |
|---|---|---|---|---|
| 2016/0282874 A1* | 9/2016 | Kurata | ................. | G01S 7/497 |
| 2019/0126958 A1* | 5/2019 | Braband | ............... | B61L 23/041 |
| 2019/0339361 A1* | 11/2019 | Fechner | ................ | G01S 13/931 |
| 2021/0176714 A1* | 6/2021 | Sano | ........................ | H04L 27/20 |
| 2023/0391385 A1* | 12/2023 | Oda | ........................ | B61L 23/041 |
| 2024/0034371 A1* | 2/2024 | Oda | ........................ | B61L 23/041 |

FOREIGN PATENT DOCUMENTS

| | | | | | |
|---|---|---|---|---|---|
| GB | 2538450 | A | * | 11/2016 | ............. B60L 15/10 |
| JP | 2002037070 | A | | 2/2002 | |
| JP | 2013156912 | A | * | 8/2013 | ............. G06Q 10/20 |
| JP | 6272347 | B2 | | 1/2018 | |
| JP | 2019078688 | A | * | 5/2019 | |
| KR | 102457747 | B1 | * | 10/2022 | |
| KR | 20230143687 | A | * | 10/2023 | |
| TN | SN86130 | A1 | * | 1/1990 | |
| WO | WO-2017129185 | A1 | * | 8/2017 | ........... G01S 13/865 |
| WO | WO-2017167529 | A1 | * | 10/2017 | ............. B61L 23/041 |
| WO | WO-2017217255 | A1 | * | 12/2017 | ............... G08G 1/16 |
| WO | WO-2023112578 | A1 | * | 6/2023 | ................. B60L 3/00 |
| WO | WO-2025032945 | A1 | * | 2/2025 | |

OTHER PUBLICATIONS

International Search Report of PCT/JP2020/035592 dated Nov. 2, 2020.

* cited by examiner

| SECTION | ID | POINT CLOUD DATA | POSITION [m] |
|---|---|---|---|
| A STATION TO B STATION | 101 |  | 10 |
| | 102 |  | 200 |
| | 103 |  | 500 |
| | ⋮ | ⋮ | ⋮ |
| B STATION TO C STATION | 107 |  | 1200 |
| | 108 |  | 1800 |
| | ⋮ | ⋮ | ⋮ |

SENSOR PERFORMANCE EVALUATION SYSTEM AND METHOD, AND AUTOMATIC DRIVING SYSTEM

TECHNICAL FIELD

The present invention relates to a technique for evaluating a sensor performance of an external sensor mounted on a track transport system that travels on a determined track, and an automatic driving technique using the technique.

BACKGROUND ART

In recent years, research for automatic driving in existing track transport systems has been conducted due to concerns about a shortage of human resources due to aging of operators, reduction in operation costs, and the like. In the track transport system in which a transport vehicle travels on a track, when there is an obstacle on the track, it is difficult to avoid the obstacle by steering. Therefore, it is important to detect the obstacle on the track in order to improve safety and operability of the track transport system. At present, the operator visually detects obstacles on the track and on a route.

On the other hand, in order to perform an unmanned operation, a mechanism for automatically detecting the obstacle on the route is required, and a method using an external sensor such as a millimeter wave radar, a laser radar, or a camera has been studied. The above-described external sensor has a feature that an actual performance (in particular, a detection distance and a resolution) with respect to a performance in specification can vary depending on a surrounding environment (weather, brightness, and surrounding structures).

In order to detect the obstacle and make a stop, it is necessary to limit the traveling speed of the vehicle to a speed which allows stopping at a detection distance of the sensor. For this purpose, it is necessary to evaluate an accuracy guarantee performance of the external sensor depending on the surrounding environment in real time. PTL 1 discloses a technique for evaluating the performance of the external sensor in real time.

CITATION LIST

Patent Literature

PTL 1: JP 6272347 A

SUMMARY OF INVENTION

Technical Problem

A value that the track transport system is to provide is punctuality and quickness, and it is required to travel as fast as possible while considering the performance of the external sensor. For this purpose, it is necessary to accurately evaluate the accuracy guarantee performance of the external sensor. In the technique described in PTL 1, the performance of the external sensor is evaluated by an index of reliability, and the accuracy guarantee performance (the detection distance and the resolution) of the external sensor is not strictly evaluated.

Since the vehicle speed is limited to a speed predetermined or a stop is made on the basis of the reliability of the external sensor, there is a possibility that the vehicle travels at a speed lower than the speed at which the vehicle can travel with the original accuracy guarantee performance of the external sensor. In order to cope with the above problem, an object of the present invention is to evaluate an accuracy guarantee detection distance of an external sensor mounted on a track transport system in real time.

Solution to Problem

The present invention to solve the above problems is a sensor performance evaluation system including: a recording unit that records an installation position of a ground installation object and an installation identifier of the ground installation object for each of a plurality of the ground installation objects installed beside a track on which a vehicle of a track transport system mounted with an external sensor travels; an installation object recognition unit that specifies the installation identifier from external sensor information including information detected by the external sensor and recognizes the ground installation object corresponding to the installation identifier by referring to the recording unit; and a detection distance calculation unit that calculates a detection distance of the external sensor. The detection distance calculation unit calculates the detection distance of the external sensor from a self-position of the vehicle at which the ground installation object is recognized and the installation position of the ground installation object recognized by the installation object recognition unit.

Advantageous Effects of Invention

According to the present invention, it is possible to evaluate in real time the detection distance of the external sensor mounted on the track transport system, that is, the accuracy guarantee detection distance of the external sensor mounted on the vehicle moving along the track. Problems, configurations, and effects other than those described above will be clarified by the following description of embodiments.

DESCRIPTION OF EMBODIMENTS

Figure 1:
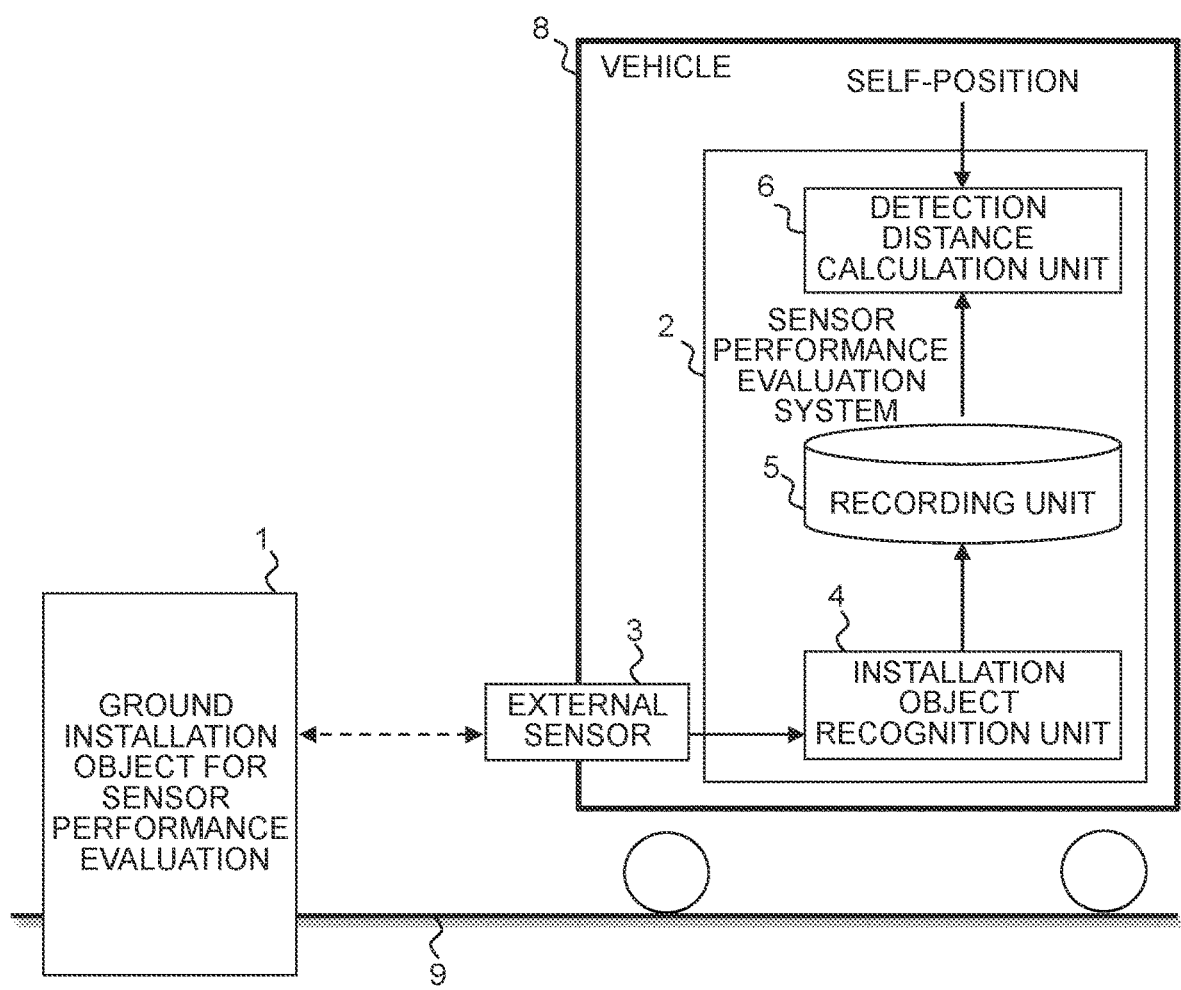
FIG. 1 is a block diagram for explaining a sensor performance evaluation system and a method using the same according to an embodiment of the present invention.

An embodiment of the present invention will be described using the drawings. Note that elements having the same effect are denoted by the same reference numerals throughout the drawings, and redundant description may be omitted.

FIG. 1 is a block diagram for explaining a sensor performance evaluation system and a method using the same according to an embodiment of the present invention.

A sensor performance evaluation method according to an embodiment of the present invention is a method of evaluating an accuracy guarantee detection distance Ls of an external sensor 3 by a system configuration including a ground installation object (hereinafter, also simply referred to as "ground installation object") 1 for sensor performance evaluation having a unique ID (a two-dimensional barcode, a shape, and the like) distinguishable from other ground installation objects and the external sensor (a camera, a laser range finder, and a millimeter wave radar) 3 that senses an external situation.

The sensor performance evaluation system 2 means a component mounted on a vehicle 8 of a track transport system as a main part for realizing the sensor performance evaluation method. As illustrated in FIG. 1, the sensor performance evaluation system 2 includes an installation object recognition unit 4 that recognizes and specifies a ground installation object on the basis of information from the external sensors 3, a recording unit 5 that can record and collate the installation position of the ground installation object 1, and a detection distance calculation unit 6 that calculates the accuracy guarantee detection distance Ls, which is a detection distance in an actual surrounding environment with respect to a detection distance Lc in the specification of the external sensor 3, of the external sensor.

The detection distance calculation unit 6 calculates the detection distance Ls of the sensor from the position of the ground installation object 1 for sensor performance evaluation recorded in the recording unit 5 and a self-position Y of the vehicle 8 as described later using FIGS. 1 and 3 and following Expressions (1) and (2). As a result, the accuracy guarantee detection distance Ls of the external sensor 3 can be evaluated in real time. Note that a method of acquiring the self-position Y will also be described later.

The external sensor 3 collects external information for preventing a collision accident related to traveling of the vehicle 8 in advance and outputs the external sensor information. The sensor performance evaluation system 2 calculates the accuracy guarantee detection distance Ls of the external sensor 3 mounted on the vehicle 8 moving along the track 9 to evaluate the detection performance in real time.

The ground installation objects are installed on the side of the track 9, that is, on a route side 13 at appropriate intervals as described later with reference to FIGS. 2 to 6, and are used for evaluation of the external sensor 3. As the ground installation objects, a plurality of ground installation objects 11, 12, 19, . . . , 31, and 32 are disposed. For example, the plurality of ground installation objects 12, 19, and 32 are recognizable by the external sensor 3 and are arranged such that each is associated with an installation identifier (for example, a two-dimensional barcode or a shape) 11 or 31 which can be distinguished from others. Note that the installation identifiers 11 and 31 are also a part of the ground installation object (11 in FIG. 2) or a single ground installation object (31 in FIG. 6). In the following description, the plurality of ground installation objects 11, 12, 19, . . . , 31, and 32 are specified with different reference numerals such as "ground installation object 11" and "ground installation object 12" in a case where any of them is distinguished and described, and are collectively referred to as the ground installation object 1 in a case where they are not distinguished (in other words, in a case where any ground installation object is acceptable).

The sensor performance evaluation system 2 is mounted on the vehicle 8 together with the external sensor 3. The sensor performance evaluation system 2 includes the ground installation object recognition unit (hereinafter, referred to as "installation object recognition unit") 4, the recording unit 5, the detection distance calculation unit 6, and a resolution detection unit 7. The installation object recognition unit 4 recognizes and specifies, for example, the ground installation objects 12, 19, and 32 on the basis of information from the external sensor 3. The recording unit 5 records the installation position of the ground installation object. The detection distance calculation unit 6 calculates the accuracy guarantee detection distance Ls. The resolution detection unit 7 detects a resolution $\delta$ of the external sensor 3 and outputs an evaluation index value.

Hereinafter, each unit will be described in more detail. The detection distance calculation unit 6 calculates the detection distance Ls different from the arranged measurement environment with respect to the detection distance Lc in the specification (catalog spec) of the external sensor 3. The detection distance Ls refers to a detection distance Ls in an actual surrounding environment (a measured value or a guaranteed value). The detection distance Ls is the accuracy guarantee detection distance Ls. The accuracy guarantee detection distance Ls (the guaranteed value is obtained from the measured value in FIG. 3) under the weather or other fluctuating conditions is often lower than the catalog value.

As described above, the detection distances of the external sensors 3 are roughly classified into two types of Lc and Ls. The first is the detection distance Lc in the specification, that is, the detection distance Lc (catalog value) obtained under the best measurement condition determined by the provider. The detection distance calculation unit 6 refers to the catalog value and replaces the catalog value with the second detection distance Ls (guaranteed value) that is a result of actual measurement in the actual surrounding environment. As a result, the accuracy guarantee detection distance Ls actually measured in the actual surrounding environment illustrated in FIG. 3 is calculated.

In addition to the camera, for example, a laser range finder or a millimeter wave radar is adopted as the external sensor 3, and the external sensor 3 detects an external situation, outputs external sensor information, and inputs the external sensor information to the sensor performance evaluation system 2. The sensor performance evaluation system 2 performs evaluation by calculating the accuracy guarantee detection distance Ls of the external sensor 3. The calculated accuracy guarantee detection distance Ls is substituted into Expression (3) to be described later, and is used for calculating a speed limit $V_{limit}$ it of the vehicle 8. This $V_{limit}$ is updated at appropriate frequency, but is calculated in real time, for example, about once per second. However, the update frequency is related to the environment and the installation density of the ground installation object 1 as described later with reference to FIG. 3.

The ground installation object 1 has a unique ID (a two-dimensional barcode, a shape, or the like) that can be distinguished from other ground installation objects. That is, the ground installation object 1 is a ground installation object attached with a unique ID and installed for sensor performance evaluation.

As will be described later with reference to FIG. 3, the detection distance calculation unit 6 calculates the detection distance Ls of the sensor from a position X of each ground installation object 1 recorded in the recording unit 5 and the self-position Y of the vehicle 8. As the self-position Y, a value obtained from integration of the vehicle speed V is generally used, but the self-position Y calculated by map matching using the laser range finder may be used, or the self-position Y obtained by a global navigation satellite system (GNSS) may be used.

Note that the resolution detection unit 7 is exemplified as a unit that detects the resolution δ of the optical camera in the external sensor 3, but may be a unit other than the optical camera as long as the resolution detection unit 7 has a function of detecting a resolution corresponding to corresponding the external sensor information. Further, in the sensor performance evaluation system 2, it is sufficient if the self-position Y of the vehicle 8 can be accurately acquired, and a method for realizing the self-position Y is not limited.

Figure 2:
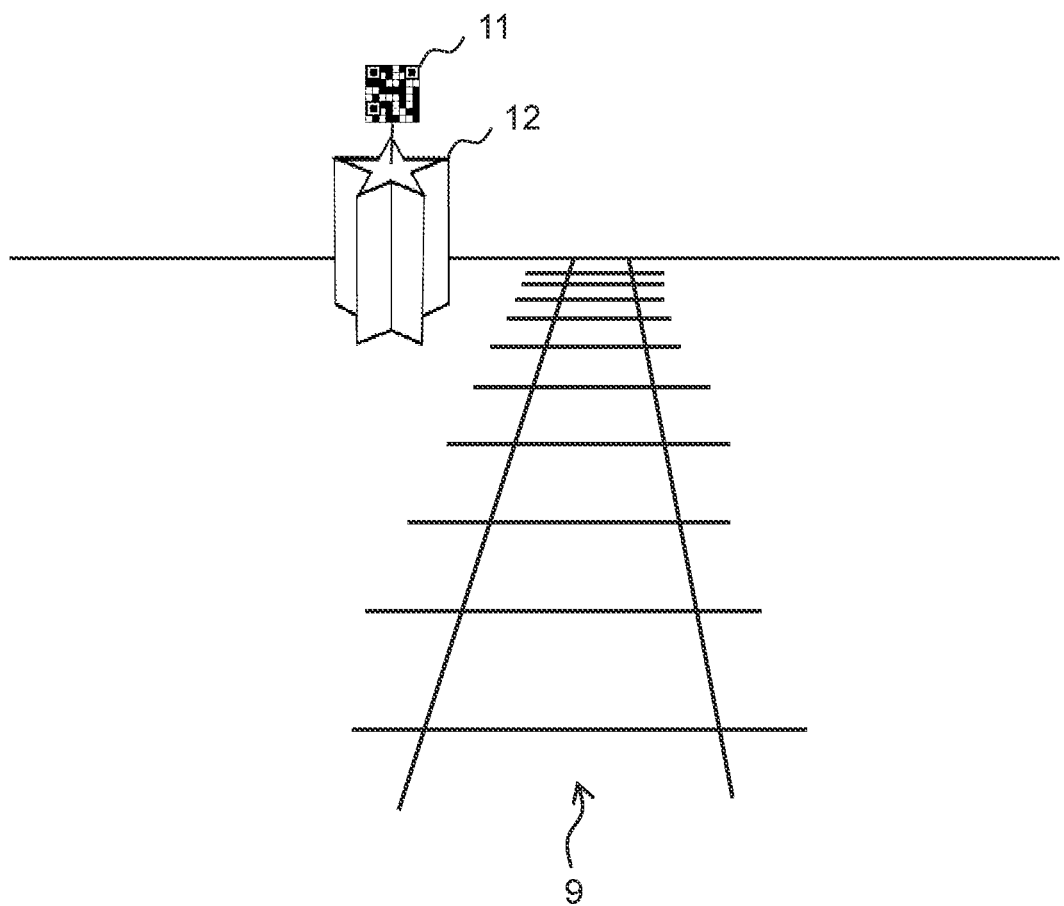
FIG. 2 is an explanatory diagram illustrating ground installation objects used in the sensor performance evaluation system of FIG. 1.

FIG. 2 is an explanatory diagram illustrating ground installation objects used in the sensor performance evaluation system of FIG. 1. The ground installation objects 11 and 12 illustrated in FIG. 2 are disposed on the ground in order to acquire sensor information by the external sensor 3. For example, in order to uniquely identify the ground installation object 12 with a camera, a two-dimensional barcode (hereinafter abbreviated as "two-dimensional barcode 11") is formed on a plane of the ground installation object 11.

A unique ID for specifying the ground installation object 12 is described in the two-dimensional barcode 11, and is collated with the information recorded in the recording unit 5 to specify the target ground installation object 12. Note that in addition to the exemplified camera acquisition information, point cloud data information of a laser range finder sensor (hereinafter, referred to as a "laser range finder") or the like may be used as the sensor information.

In a case where the laser range finder is used as the external sensor 3, it is possible to recognize the shape of a three-dimensional object at high speed instead of the planar two-dimensional barcode 11. In this case, the ground installation object 12 having a unique shape is installed on the route. Therefore, the ground installation object 12 can be distinguished from other ground installation objects, and the shape of the ground installation object is collated with the information recorded in the recording unit 5 to specify the target ground installation object.

In the case of a sensor capable of recognizing only the presence or absence of an object and the distance as in the case of a millimeter wave radar, the ground installation object 12 cannot be uniquely identified, and thus the sensor is combined with a camera or a laser range finder to identify which ground installation object 12 is the object recognized by the millimeter wave radar. At that time, when the ground installation object 12 alone is unique, the two-dimensional barcode 11 is not essential.

Note that, although an example of newly installing a structure has been described as the ground installation object 12, in a structure having a characteristic shape in an existing ground structure, the structure may be the ground installation object 12. In this way, the cost required for installing the ground installation object 12 can be reduced.

Figure 3:
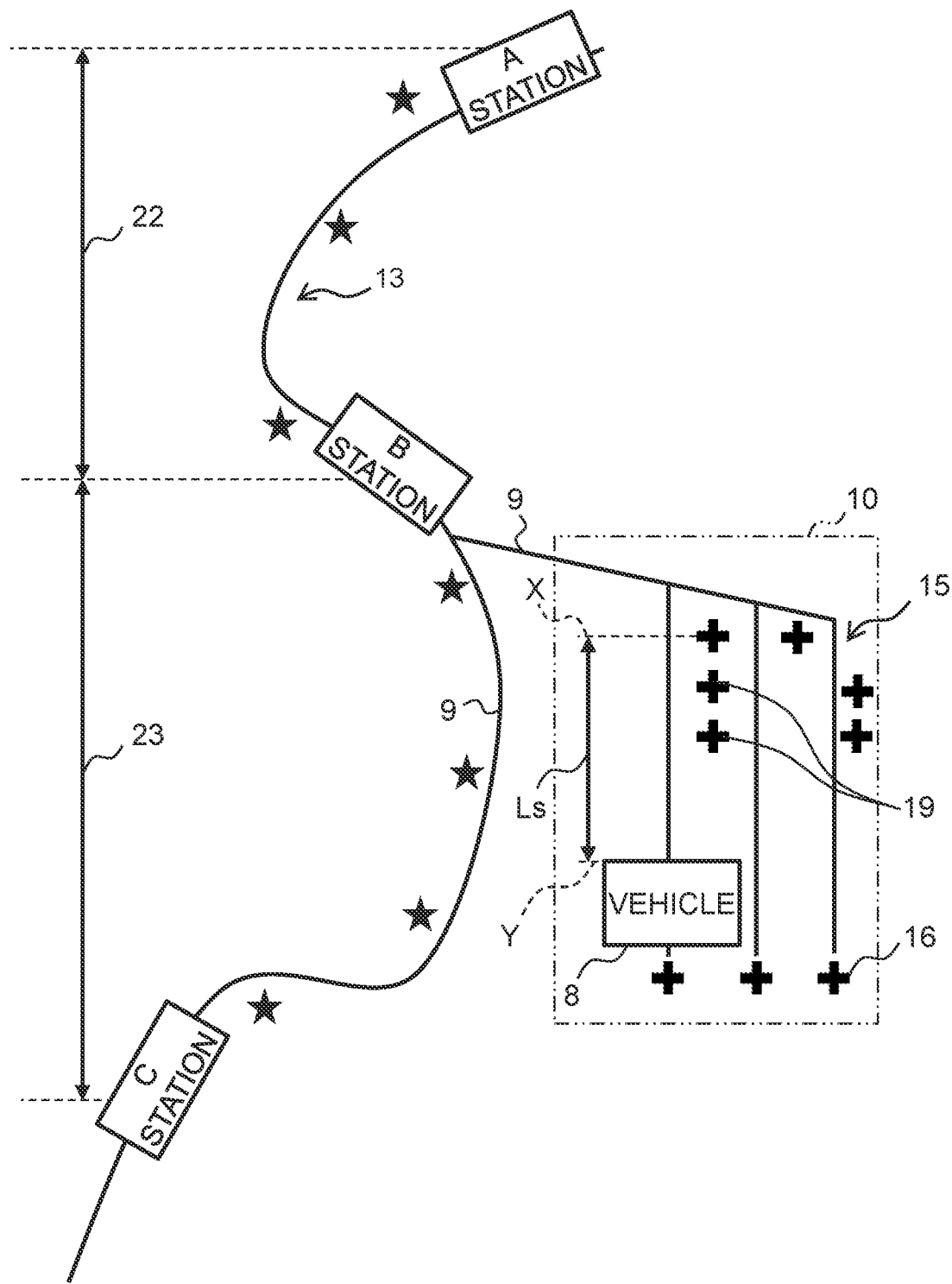
FIG. 3 is an explanatory diagram illustrating installation positions of the ground installation objects illustrated in FIG. 2 on a map.

FIG. 3 is an explanatory diagram illustrating installation positions of the ground installation objects 1 illustrated in FIG. 2 on a map. In addition to a star sign in which the individual symbol of the ground installation object 1 is omitted in FIG. 3, as exemplified by the ground installation object 19, the ground installation objects 1 are installed at basically constant intervals on the route side 13 of the vehicle 8 moving along the track 9. It is desirable that each ground installation object 1 be unique over the entire section of the track 9 on which the vehicle 8 operates, but each ground installation object 1 may be unique only within an arbitrary section such as an inter-station section 22 or an inter-station section 23 (see FIG. 5).

In this case, it is possible to uniquely specify the ground installation object 1 recognized by the external sensor 3 by additionally grasping the section in which the vehicle 8 exists. The interval at which the external sensors 3 are installed along the route side 13 is arbitrary, but it is desirable to install the external sensors 3 as many as possible in order to constantly monitor the accuracy guarantee detection distance Ls of the external sensors 3 and enhance the immediacy. It is desirable to install at least one sensor near the station and evaluate the accuracy guarantee detection distance Ls of the external sensor 3 before departure.

The ground installation object 19 is also installed in a vehicle yard 10. The vehicle yard 10 is installed at a route side 15 or a route end position 16. In addition, in the vehicle yard 10, the ground installation objects 19 are mainly installed in the vicinity of the position where the vehicle 8 is anchored. In addition, the ground installation object 19 installed in the vehicle yard 10 is desirably installed at a position of the detection distance Lc in the specification of each external sensor 3 from the anchorage position of the vehicle 8 and a position separated from the detection distance Lc by a predetermined distance.

In this way, in a vehicle inspection performed when the vehicle 8 enters a business operation, it is possible to check whether the external sensor 3 has the performance as described above with respect to the detection distance Lc in the specification each time. At this time, the detection distance calculation unit 6 acquires the self-position Y of the vehicle 8 for the purpose of calculating the accuracy guarantee detection distance Ls. More specifically, in FIG. 3, while the vehicle 8 is approaching the ground installation object 19, the detection distance calculation unit 6 acquires the position Y of the vehicle 8 at which the external sensor 3 recognizes the ground installation object 19, and calculates the accuracy guarantee detection distance Ls by using Expression (1) or Expression (2) described later.

It is desirable to install a plurality of ground installation objects 19 within the range of the detection distance Lc in the specification of the external sensor 3. In this way, in the vehicle inspection performed when the vehicle 8 enters the business operation, the accuracy guarantee detection distance Ls of the external sensor 3 can be evaluated accurately and with high immediacy. Next, the processing of the sensor performance evaluation system 2 will be described with reference to FIG. 4.

Figure 4:
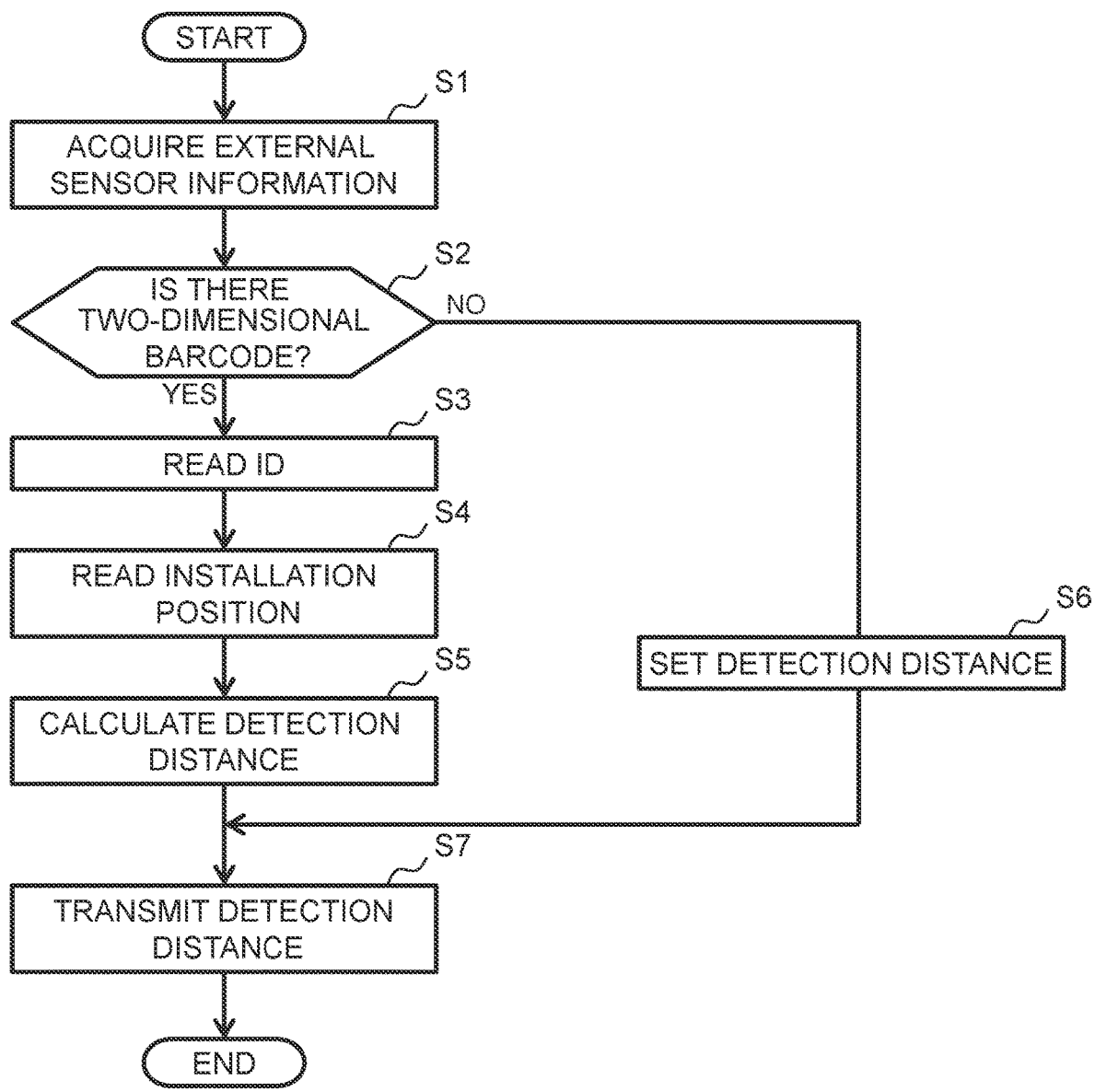
FIG. 4 is a flowchart illustrating a processing procedure of a sensor evaluation unit in the sensor performance evaluation system of FIG. 1.

FIG. 4 is a flowchart illustrating a processing procedure of the sensor performance evaluation system 2 in FIG. 1. The sensor performance evaluation method according to the present invention includes some of the processing procedures illustrated in FIG. 4. Note that, in FIG. 4, an example will be described in which a camera is used as the external sensor 3, and an image showing the ground installation object 1 on which the two-dimensional barcode 11 is formed is used as the external sensor information to be read by the camera. However, the external sensor information is not limited thereto.

As illustrated in FIG. 4, the sensor performance evaluation system 2 calculates the accuracy guarantee detection distance Ls of the external sensor 3 (S5), and transmits the accuracy guarantee detection distance Ls to a speed limit determination unit (not illustrated) (S7). Steps S1 to S3 indicate the processing of the installation object recognition unit 4. Step S4 indicates the processing of the recording unit 5. Steps S5 to S7 indicate the processing in the detection distance calculation unit 6. First, in step S1, image data as external sensor information is acquired from the camera which is the external sensor 3, and the process proceeds to step S2.

In step S2, a two-dimensional barcode is extracted by applying image processing to the image data acquired by the installation object recognition unit 4. For the image processing for extracting a two-dimensional barcode, general software can be used. In this sensor performance evaluation method, it is sufficient if the two-dimensional barcode can be extracted from the image data, and the method is not limited. When the two-dimensional barcode is extracted (Yes in S2), the process proceeds to step S3. When the two-dimensional barcode is not extracted (No in S2), the process proceeds to step S6.

In step S3, a unique ID for specifying the ground installation object 1 is read from the two-dimensional barcode extracted by the installation object recognition unit 4. After transmitting the read ID to the recording unit 5, the process proceeds to step S4.

In step S4, the recording unit 5 uses the IDs of the ground installation objects 1 recorded in the storage means as search keys to collate the installation positions associated with the respective IDs. Based on the collation result, the recording unit 5 reads the installation position X (FIG. 3) of the ground installation object currently recognized by the camera. The recording unit 5 transmits the read installation position X to the detection distance calculation unit 6, and then the process proceeds to step S5.

In step S5, the detection distance calculation unit 6 calculates the detection distance Ls of the camera from the position information of the ground installation object 1 acquired from the recording unit 5 and the self-position Y of the vehicle 8 by following Expression (1).

$$\text{Accuracy guarantee detection distance } Ls \text{ of external sensor 3=ground installation object position } X\text{-self-position } Y \quad (1)$$

The calculation expression of the detection distance Ls is changed according to the traveling direction of the vehicle 8. In this example, a case has been described in which the value of the self-position Y increases in the traveling direction (ascending order), and thus the detection distance Ls is expressed by Expression (1). Conversely, in a case where the value of the self-position Y decreases in the traveling direction (descending order), the detection distance Ls is expressed by following Expression (2).

$$\text{Accuracy guarantee detection distance } Ls \text{ of external sensor 3=self-position } Y\text{-ground installation object position } X \quad (2)$$

After the accuracy guarantee detection distance Ls is calculated, the process proceeds to step S7, and the description will be given later.

In step S6 in which the process proceeds to No in step S2, the detection distance calculation unit 6 sets a previous value to the detection distance Ls. When a plurality of external sensors $3_1$ to $3_n$ is present, the detection distance Ls set in step S6 by the detection distance calculation unit 6 is defined such that the accuracy guarantee detection distance Ls of the external sensor 3 determined to be more effective among the plurality of external sensors is adopted. As an example of the definition, in a case where the plurality of external sensors $3_1$ to $3_n$ is mounted, it is preferable to adopt a minimum value $Ls_s$ among accuracy guarantee detection distances $Ls_1$ to $Ls_n$ obtained from the respective external sensors $3_1$ to $3_n$. By this determination, only the external sensor information by the external sensor 3 determined to have the highest safety, that is, strictly is provided to the sensor performance evaluation system 2, so that a result with high safety can be expected.

In step S6, the detection distance calculation unit 6 sets the previous value to the detection distance Ls. However, in addition to adopting the minimum value $Ls_s$ determined strictly as described above among the accuracy guarantee detection distances $Ls_1$ to $Ls_n$ of the plurality of external sensors $3_1$ to $3_n$, in some environment, in step S6, the detection distance calculation unit 6 may set a large detection distance $Ls_L$ determined gently instead of the previous value set as the detection distance Ls.

Alternatively, the sensor performance evaluation system 2 may notify a host system of a failure or error notification of the external sensor 3 without setting the detection distance Ls. Note that the host system for the sensor performance evaluation system 2 uses a result output obtained from the sensor performance evaluation system, and an example of the host system is an automatic driving system described later. In this manner, the process proceeds to step S7 after step S5 or step S6. In step S7, the accuracy guarantee detection distance Ls of the external sensor 3 is transmitted to the host system.

Although the example using the camera is illustrated in FIG. 4, the accuracy guarantee detection distance Ls of the external sensor 3 can be evaluated by similar processing also in other external sensors 3. For example, in the case of the laser range finder, a target ground installation object is specified by matching the point cloud data obtained from the laser range finder with the point cloud data recorded in the recording unit 5. Note that in addition to the laser range finder, a three-dimensional laser scanner or the like can also be adopted.

As described above, in a case where there are a plurality of external sensors 3, the process of FIG. 4 is performed for each external sensor 3 to calculate the detection distance Ls. The calculated accuracy guarantee detection distances Ls of the external sensors 3 may be transmitted to the host system, or the minimum value $Ls_s$ of the accuracy guarantee detection distances Ls of the external sensors 3 may be transmitted to the host system.

In a case where there are a plurality of external sensors 3, when the first external sensor $3_1$ recognizes the ground installation object 1, but the second external sensor $3_2$ cannot recognize the ground installation object 1, it may be determined that the second external sensor $3_2$ has failed. In this way, the sensor performance evaluation system 2 can also execute failure determination of the external sensor 3.

Figure 5:
FIG. 5 is an explanatory diagram illustrating an example of a data format of the ground installation objects recorded in a recording unit in the sensor performance evaluation system of FIG. 1.
Figure 5:
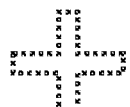
Figure 5:
Figure 5:
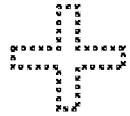
Figure 5:
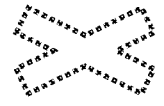

FIG. 5 is an explanatory diagram illustrating a data format of the ground installation objects recorded by the recording unit 5 in the sensor performance evaluation system 2 of FIG. 1. In FIG. 5, a case where a camera and a laser range finder are used as the external sensor 3 will be described. The ID, the unique point cloud data, and the installation position of the ground installation object 1 are recorded in association with each ground installation object 1.

As the ID, a value of a two-dimensional barcode formed on each ground installation object 1 is recorded. The point cloud data is recorded when the ground installation object 1 is measured in advance by the laser range finder.

As described in FIG. 3, in a case where the ground installation object 1 is made unique in an arbitrary section such as the inter-station sections 22 and 23, information for specifying the section is added to the data format of the recording unit 5. Although FIG. 5 illustrates an example in which the information for specifying the section is added, it is a matter of course that the information on the section is unnecessary in a case where the ground installation object is unique in all sections.

FIG. 2 illustrates an example of the ground installation object for evaluating the accuracy guarantee detection distance Ls of the external sensor 3. In addition to the detection distance Ls, the performance of the external sensor 3 has an evaluation axis of the resolution δ indicating what size of an obstacle can be detected. In order to use this, the sensor performance evaluation system 2 may include a resolution calculation unit (not illustrated) in the detection distance calculation unit 6. The resolution calculation unit outputs, as the resolution δ, an index value associated with the minimum size of the recognizable ground installation object among the ground installation objects 1.

Figure 6:
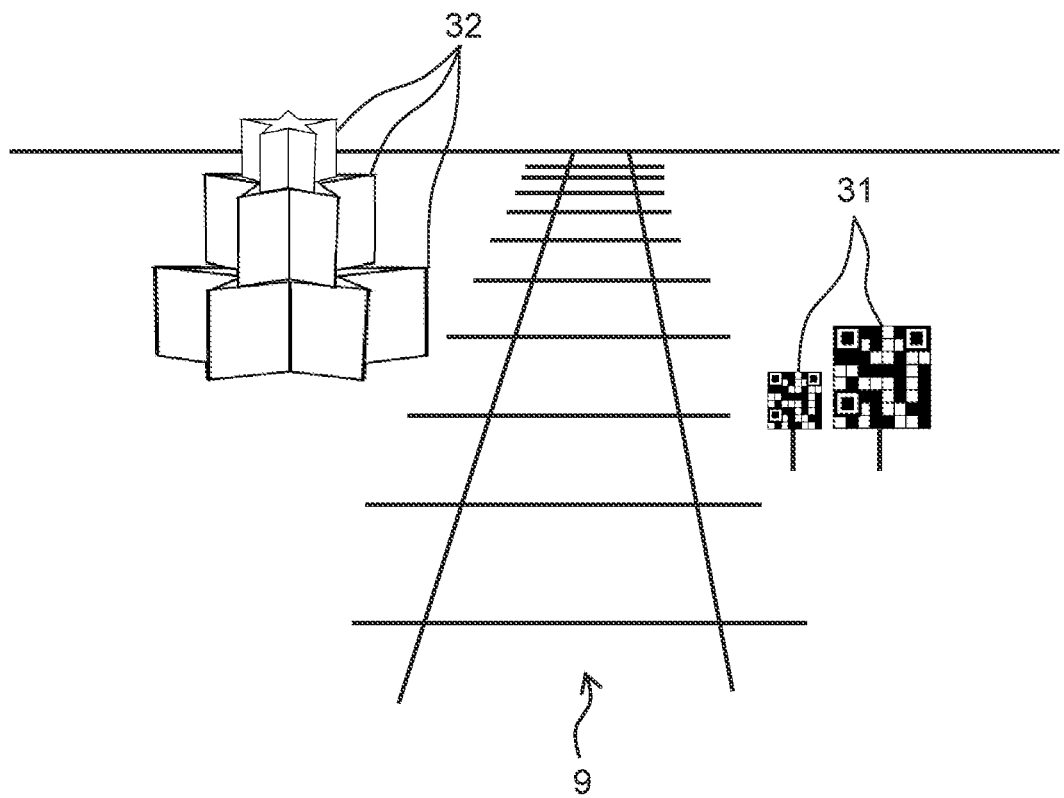
FIG. 6 is an explanatory diagram illustrating ground installation objects used by a resolution calculation unit in the sensor performance evaluation system of FIG. 1.

FIG. 6 is an explanatory diagram illustrating the ground installation objects 31 and 32 applied to the resolution calculation unit provided side by side with the sensor performance evaluation system 2 in FIG. 1. As illustrated in FIG. 6, for cameras, the ground installation objects 31 in which two-dimensional barcodes are formed in two different stages of sizes are provided side by side. In addition, for the laser range finder or the millimeter wave radar, the entire shape of the ground installation object 12 illustrated in FIG. 2 is utilized, and the ground installation objects 32 stacked and formed from a lower layer to an upper layer are installed in partially different sizes, that is, sizes of three stages of large, middle, and small.

First, in the case of a camera, for example, an accuracy guarantee resolution δS of the camera can be evaluated depending on the size of the ground installation object 31 can be recognized among multiple stages such as two large and small stages. More specifically, the smallest value among the sizes (widths) of the recognized two-dimensional barcodes is adopted as the accuracy guarantee resolution δS of the camera.

In addition, in the case of the laser range finder or the millimeter wave radar, similarly to the case of the camera, the accuracy guaranteed resolution δs of the external sensor 3 can be evaluated depending on the size of the ground installation object 32 that can be recognized among multiple stages such three stages of large, medium, and small. Next, the processing of the resolution calculation unit will be described by simplifying the ground installation objects 31 and 32 into two large and small stages, but this is for convenience of description and is not limited to two large and small stages.

The relationship between the resolution calculation unit and the ground installation objects 31 and 32 corresponds to the relationship between a measurement instrument that measures the resolution (resolution) of a general imaging system and a test target used for measurement. In such a test target, a line pattern serving as an index of resolution (resolution) is drawn with a predetermined width and interval, and is designed to be able to be installed on the same plane as the imaging target. The measurement instrument can identify the resolution of the imaging system by specifying the smallest line pattern that can be identified.

On the other hand, in the ground installation object 31 in the sensor performance evaluation system 2 according to the embodiment of the present invention, two-dimensional barcodes having different sizes are used as an example. In addition, unique objects having different sizes and shapes are used for the ground installation objects 32. In the sensor performance evaluation system 2, in a case where the large ground installation object can be recognized, but the small ground installation object cannot be recognized, the resolution is set to $\delta_N$. In addition, in a case where any of the large and small ground installation objects cannot be recognized among the ground installation objects 31 and 32 having different sizes, the resolution is set to $\delta_L$. In addition, in a case where even small ground installation object can be recognized, the resolution is set to $\delta_U$.

The resolution calculation unit attempts to simultaneously recognize the ground installation objects 31 installed at the same position and having different sizes while approaching the ground installation objects. At that time, the resolution calculation unit outputs, as the resolution, the smallest size of the recognized ground installation object in the following cases. In a case where the large ground installation object cannot be recognized at a predetermined distance, the resolution is output as $\delta_L$. In a case where the large ground installation object can be recognized at the same distance, but the small ground installation object cannot be recognized, the resolution is output as $\delta_N$. In a case where even the small ground installation object can be recognized at the same distance, the resolution is output as $\delta_U$. The resolution calculation unit includes information associated with the resolution δ corresponding to each case described above or the index value indicating the range of the resolution.

As described above, the minimum ground installation object 31 recognizable by the resolution calculation unit is defined such that the corresponding resolution δ is associated with each size of the ground installation object. This definition is stored in the recording unit 5 in the form of a mathematical expression or a table (not illustrated) and may be referred to by the resolution calculation unit and the speed limit determination unit. In addition, the ground installation object 32 is also defined such that corresponding resolution δ is associated with each size of the ground installation object.

The vehicle 8 using the evaluated accuracy guarantee detection distance Ls of the external sensor 3 in the sensor performance evaluation system 2 illustrated in FIG. 1 will be described. In the vehicle 8 which performs an unmanned operation, it is necessary to detect an obstacle on the track and stop the vehicle 8. In order to detect the obstacle and make a stop, it is necessary to limit the traveling speed of the vehicle 8 to a speed which allows stopping at the accuracy guarantee detection distance Ls of the external sensor 3. The traveling speed and the stop distance of the vehicle 8 have a relationship defined by the following Expression (3).

[Formula 1]

$$V_{limit} = \alpha \left( -t_i + \sqrt{\frac{t_i^2 + 2L_s}{\alpha}} \right) \quad (3)$$

Here, $V_{limit}$ [m/s] is a speed limit of the vehicle 8 obtained from the accuracy guarantee detection distance Ls of the external sensor 3. In addition, α [m/s²] is the maximum deceleration of the vehicle 8. Further, $t_i$ [s] is an idle running time. Ls [m] is the accuracy guarantee detection distance Ls of the external sensor 3. Since the maximum deceleration a and the idle running time $t_i$ are defined by the specification of the vehicle 8, the traveling speed (speed limit $V_{limit}$) which allows stopping at the accuracy guarantee detection distance Ls of the external sensor 3 can be immediately calculated once the accuracy guarantee detection distance Ls of the external sensor 3 is known.

In the vehicle 8 which moves along the conventional unmanned track 9, the detection distance Lc in the specification is adopted as the accuracy guarantee detection distance Ls of the external sensor 3. Alternatively, as exemplified in PTL 1, the accuracy guarantee detection distance Ls is grasped on the basis of the surrounding environment or the performance degradation of the sensor by some methods. In the case of PTL 1, a method is adopted which sets the speed limit $V_{limit}$ of the vehicle 8 to be low in anticipation of a decrease in the accuracy guarantee detection distance Ls of the external sensor 3. For example, in a case where forward visibility is poor due to fog, the traveling speed of the vehicle 8 is limited to a prescribed speed.

However, in the case of PTL 1, the prescribed speed is defined assuming the worst case, and thus the detection distance $Ls_s$ shorter than the actual accuracy guarantee detection distance Ls of the external sensor 3 is assumed. As a result, the speed limit $V_{limit}$ of the vehicle 8 may be set to the lower side with a considerable margin.

Therefore, in the original accuracy guarantee detection distance Ls of the external sensor 3, the vehicle travels at a prescribed lower speed although the traveling speed can be set higher, and there is a possibility that punctuality and quickness deteriorate.

As described above, in the autonomous traveling vehicle described in PTL 1, the vehicle speed is limited to a predetermined speed or a stop is made on the basis of the reliability of the external sensor, not necessarily in real time. As a result, the speed may be set lower than the speed at which the vehicle can travel with the original accuracy guarantee performance Ls of the external sensor 3.

In this regard, when the accuracy guarantee detection distance Ls of the external sensor 3 can be accurately evaluated by the sensor performance evaluation system 2 according to the embodiment of the present invention, the speed limit $V_{limit}$ of the vehicle 8 can be calculated on the basis of the accuracy guarantee detection distance Ls of the external sensor 3 evaluated by the sensor performance evaluation system from Expression (3). As a result, the vehicle 8 can be caused to travel on the basis of the calculated speed limit $V_{limit}$. In this way, even when the performance of the external sensor 3 is deteriorated due to a change in the surrounding environment, it is possible to stay on a normal schedule to the maximum, and it is possible to minimize the deterioration in punctuality and quickness.

The accuracy guarantee detection distance Ls of the external sensor 3 can be checked every time in the vehicle inspection performed when the vehicle 8 enters the business operation. If the accuracy guarantee detection distance Ls of the external sensor 3 is less than the detection distance Lc in the specification, the following countermeasure can be considered. First, the sensor performance evaluation system 2 transmits the accuracy guarantee detection distance Ls of the external sensor 3 to an operation management system as an example. The operation management system having received the accuracy guarantee detection distance Ls may generate the operation schedule of the day based on the speed limit $V_{limit}$ calculated according to the received accuracy guarantee detection distance Ls.

In this way, the schedule corresponding to the accuracy guarantee detection distance Ls of the external sensor 3 is obtained, so that a sudden schedule change can be prevented, and convenience for passengers can be improved. In addition, an obstacle on a track to be detected may vary depending on a place (an inter-station section or a platform). For example, in a platform where a person is expected to fall, the obstacle to be detected includes a person. Therefore, in such a place, the external sensor 3 needs to be supported by a person detection function capable of detecting and recognizing a person and a human body recognition function such as AI. These functions may also be included in the installation object recognition unit 4.

From such a viewpoint, as in the conventional unmanned track transport system, in a case where the obstacle to be detected is different for each place, and the required resolution δ of the external sensor 3 is different on the basis of the obstacle to be detected, the countermeasure may be performed as follows. That is, the speed limit $V_{limit}$ of the vehicle 8 may be defined from the relationship between the accuracy guarantee resolution δS of the external sensor 3 evaluated in the sensor performance evaluation system 2 and method and the automatic driving system and the resolution $δ_L$ obtained for each place. In this regard, a clear definition may be stored in the recording unit 5 in the form of a mathematical expression or a table (not illustrated) and may be referred to by the resolution calculation unit and the speed limit determination unit.

With the above-described countermeasure, even when the accuracy guaranteed resolution δS of the external sensor 3 is reduced due to the surrounding environment, the speed limit $V_{limit}$ can be increased in a section in which only a low resolution $δ_L$ is required. As a result, the deterioration in punctuality and quickness can be minimized. In addition, by recording the performance of the external sensor 3 every day and evaluating the performance in time series, it is also possible to perform predictive diagnosis of aging degradation and failure of the external sensor 3.

As described above, according to the sensor performance evaluation system 2, it is possible to accurately evaluate the accuracy guarantee performance of the external sensor 3 mounted on the vehicle 8 moving along the track 9. The accuracy guarantee performance to be evaluated is at least one of the accuracy guarantee detection distance Ls and the accuracy guarantee resolution δs. The accuracy guarantee performance obtained in this manner has excellent usability in terms of immediacy. That is, when the upper speed limit at which the vehicle can travel is set on the basis of the accuracy guarantee performance, it is possible to improve punctuality and quickness while considering the performance of the external sensor 3.

In the above description, the recording unit 5 also has a collation function of collating the information stored in the storage means with a search keyword. The storage means may be at least a memory of a memory and a permanent storage device. The permanent storage device may be one or more persistent storage devices, for example, a hard disk drive (HDD) or a solid state drive (SSD). Further, in the above description, the function such as the collation function provided in the sensor performance evaluation system 2, and the installation object recognition unit 4, the detection distance calculation unit 6, and the recording unit 5 included in the sensor performance evaluation system 2 may be realized by at least one of the following two types or a combination thereof.

The first of the two types may be realized by executing one or more computer programs by a processor. The second of the two types may be realized by one or more hardware circuits (for example, a field-programmable gate array (FPGA) or an application specific integrated circuit (ASIC)).

In a case where the function is realized by executing the program by the processor, determined processing is appropriately performed by using a storage device and/or an interface device, and thus, the function may be at least a part of the processor.

The processor may be one or more processor devices. The at least one processor device may typically be a microprocessor device such as a central processing unit (CPU), but may be another type of processor device such as a graphics processing unit (GPU).

The at least one processor device may be a processor device in a broad sense such as a hardware circuit (for example, the FPGA or the ASIC) that performs a part or all of processing.

The processing described with the function as the subject may be processing performed by a processor or a device including the processor. The program may be installed from a program source. The program source may be, for example, a program distribution computer or a computer-readable recording medium (for example, a non-transitory recording medium). The description of each function is an example, and a plurality of functions may be integrated into one function, or one function may be divided into a plurality of functions.

In addition to the sensor performance evaluation system 2, the automatic driving system (not illustrated) includes an automatic driving unit (not illustrated) that performs the unmanned operation of the vehicle 8 by using an evaluation result obtained from the sensor performance evaluation system 2. The automatic driving unit means, for example, an automatic train operation (ATO). The automatic driving unit preferably includes the speed limit determination unit and a speed limit observation unit (not illustrated). The speed limit determination unit uses $V_{limit}$ [m/s] calculated by above Expression (3) as an example. Note that, in the automatic driving system capable of unmanned operation, an operation mode in which the operator is on board can also be regarded as an embodiment of the present invention.

As described above, the traveling speed (speed limit $V_{limit}$) which allows stopping at the accuracy guarantee detection distance Ls of the external sensor 3 can be immediately calculated by the sensor performance evaluation system 2 once the accuracy guarantee detection distance Ls of the external sensor 3 is known. $V_{limit}$ [m/s] is a speed limit of the vehicle 8 obtained from the accuracy guarantee detection distance Ls of the external sensor 3. The speed limit determination unit (not illustrated) determines the speed limit according to the evaluation of the external sensor 3 provided from the sensor performance evaluation system 2, and outputs the information to the speed limit observation unit (not illustrated). More specifically, the speed limit observation unit visualizes the speed limit $V_{limit}$ for the operator or outputs information related to the speed limit $V_{limit}$ to the automatic driving unit, thereby realizing safe operation of the track transport system.

Although the embodiment of the present invention has been described above, the present invention is not limited to the above-described embodiment, and various modifications can be made without departing from the gist of the present invention.

The sensor performance evaluation system 2 according to the embodiment of the present invention can be summarized as follows.

[1] The sensor performance evaluation system 2 according to the embodiment of the present invention includes the recording unit 5, the installation object recognition unit 4, and the detection distance calculation unit 6.

The recording unit 5 records the installation position X of the ground installation object 1 and the installation identifiers 11 and 31 as the ground installation objects 1 for each of the plurality of ground installation objects 1. The plurality of ground installation objects 1 are installed beside the track 9 on which the vehicle 8 of the track transport system travels. The external sensor 3 is mounted on the vehicle 8 of the track transport system and detects information. The information detected by the external sensor 3 includes external sensor information.

The installation object recognition unit 4 specifies the installation identifiers 11 and 31 from the external sensor information. The installation object recognition unit 4 recognizes the ground installation objects corresponding to the installation identifiers 11 and 31 specified in this manner with reference to the recording unit 5.

The detection distance calculation unit 6 calculates the detection distance Ls of the external sensor 3. That is, the detection distance calculation unit 6 calculates, as the detection distance Ls of the external sensor 3, the maximum distance at which the installation object recognition unit 4 can recognize the ground installation object 1. That is, the detection distance Ls is the distance Ls from the external sensor 3 to the ground installation object 1 when the external sensor 3 recognizes the ground installation object 1.

Here, the external sensor 3 is fixed to the vehicle 8, and thus it is assumed that the external sensor 3 has the same position as the self-position Y of the vehicle 8. For simplicity of explanation, the length of the vehicle 8 is ignored. At this time, the detection distance calculation unit 6 can calculate the detection distance Ls of the external sensor 3 from the self-position Y of the vehicle 8 and the installation position X of the ground installation object 1.

The sensor performance evaluation system 2 calculates the detection distance Ls from the self-position Y of the vehicle 8 and the installation position of the ground installation object 1. As the self-position Y of the moving vehicle 8, at least one of an integral value of the vehicle speed V, a calculated value by map matching using a laser range finder, and the self-position Y obtained by GNSS may be used. Note that information recorded in advance in the recording unit 5 is read and used as the installation position of the ground installation object 1.

According to the sensor performance evaluation system 2, it is possible to provide the sensor performance evaluation system 2 capable of evaluating the accuracy guarantee detection distance Ls of the external sensor 3 mounted on the track transport system in real time. That is, by substituting the detection distance Ls, which is the output of the evaluation result, into determined Expression (3), the accuracy guarantee detection distance Ls with excellent usability in terms of immediacy can be calculated so that the speed limit $V_{limit}$ of the vehicle can be calculated. In addition, since the external sensor 3 hardly misrecognizes the ground installation objects 12, 19, and 32 due to the ground installation objects 11 and 31 in which the installation identifiers which are distinguishable from others are formed, accurate evaluation can be easily obtained.

[2] In the sensor performance evaluation system 2 according to [1], the ground installation objects 31 and 32 having two or more types of different sizes are installed at one place. Further, in addition to the detection distance calculation unit 6, the sensor performance evaluation system 2 further includes a resolution calculation unit that calculates the resolution δ of the external sensor 3. The resolution calculation unit calculates the resolution δ of the external sensor 3 on the basis of the sizes of the recognized ground installation objects 31 and 32.

Accordingly, in addition to the accuracy guarantee detection distance Ls as the accuracy guarantee performance of the external sensor 3 mounted on the vehicle 8 moving along the track 9, it is possible to accurately evaluate even the accuracy guarantee resolution δS in real time.

[3] In the sensor performance evaluation system 2 according to [2], the resolution calculation unit attempts to simultaneously recognize the ground installation objects 31 installed at the same position and having different sizes while approaching the ground installation objects. At that time, the resolution calculation unit outputs the resolution δ associated with the installation identifier 31 having the smallest recognized size. In a case where the large ground installation object cannot be recognized at a certain distance, the resolution is output as $\delta_L$. In a case where the large ground installation object can be recognized at the same distance, but the small ground installation object cannot be recognized, the resolution is output as $\delta_N$. In a case where even the small ground installation object can be recognized at the same distance, the resolution is output as $\delta_U$.

The resolution calculation unit includes information associated with the resolution δ corresponding to each case described above or the index value indicating the range of the resolution. This information is stored in the recording unit 5 and can be referred to by both the resolution calculation unit and the speed limit determination unit. In addition, the ground installation object 32 is also defined such that corresponding resolution δ is associated with each size of the ground installation object. Accordingly, the accuracy guarantee resolution δs as the accuracy guarantee performance of the external sensor 3 can be accurately and easily evaluated by a combination of the simple ground installation object 32 or installation identifier 31 and the sensor performance evaluation system 2.

[4] In the sensor performance evaluation system 2 according to [1], the ground installation objects 12 and 32 may be provided with or partially formed with the ground installation objects 1 having the two-dimensional barcodes 11 and 31 as installation identifiers.

[5] In the sensor performance evaluation system 2 according to [1], point cloud data may be adopted as the installation identifiers for the ground installation objects 12 and 32. Accordingly, when a laser range finder (three-dimensional laser scanner) or the like is adopted as the external sensor 3, the external appearance shapes of the ground installation objects 12 and 32 formed of the three-dimensional structure can be read at high speed and accurately.

[6] In the sensor performance evaluation system 2 according to [1], in a case where the plurality of external sensors 31 to 3n are mounted, the detection distance calculation unit 6 preferably adopts the minimum value $Ls_s$ among the accuracy guarantee detection distances $Ls_1$, $Ls_1$ to $Ls_n$ obtained from the respective external sensors $3_1$ to $3_n$. By this determination, improvement in safety can be expected.

[7] The sensor performance evaluation system 2 according to [1] may further include: the speed limit determination unit that determines the speed limit $V_{limit}$ based on the calculated detection distance Ls; and the speed limit observation unit that allows the operator to easily observe the speed limit $V_{limit}$ determined by the speed limit determination unit and performs, for example, visualization output.

The automatic driving system according to the embodiment of the present invention can be summarized as follows.

[8] In addition to the sensor performance evaluation system 2 according to [7], the automatic driving system further includes the automatic driving unit that controls the traveling speed within a range not exceeding the speed limit $V_{limit}$ determined by the speed limit determination unit.

According to [7] or [8], when the upper speed limit at which the vehicle can travel is set on the basis of the accuracy guarantee performance of the external sensor 3, it is possible to improve punctuality and quickness while considering the performance of the external sensor 3.

The sensor performance evaluation method according to the embodiment of the present invention can be summarized as follows.

[9] The installation identifiers 11 and 31 are specified (S2, S3) from the external sensor information including the information detected (S1) by the external sensor 3 mounted on the vehicle 8 of the track transport system. Next, for each of the plurality of ground installation objects 1 installed beside the track 9 on which the vehicle 8 mounted with the external sensor 3 travels, the ground installation objects 1 corresponding to the specified installation identifiers 11 and 31 are recognized (S4) with reference to the recording unit 5 that records the installation position X of the ground installation object 1 and the installation identifiers 11 and 31 of the ground installation object 1. Next, the detection distance Ls of the external sensor is calculated from the self-position X of the vehicle 8 at which the ground installation object 1 is recognized and the recognized installation position X of the ground installation object 1 (S5).

Note that the detection distance Ls is the maximum distance at which the external sensor 3 can recognize the ground installation object 1. Furthermore, the self-position Y of the vehicle 8 indicates a position when the ground installation object 1 is recognized while the vehicle 8 is approaching the ground installation object 1. As described above, according to the sensor performance evaluation method of the present invention, it is possible to obtain the same operation and effect as those of the sensor performance evaluation system 2 of [1].

REFERENCE SIGNS LIST 1, 12, 19, 32 ground installation object
2 sensor evaluation unit
3 external sensor
4 installation object recognition unit
5 recording unit
6 detection distance calculation unit
7 resolution calculation unit
8 vehicle
9 track
11, 31 installation identifier (ground installation object)
2 sensor performance evaluation system
Lc detection distance (in specification of external sensor 3)
$L_S$ accuracy guarantee detection distance
$V_{limit}$ speed limit
X ground installation object position
Y self-position
Z detection distance (in actual surrounding environment)
δ resolution

The invention claimed is:
1. A sensor performance evaluation system comprising:
a recording unit that records an installation position of a ground installation object and an installation identifier of the ground installation object for each of a plurality of the ground installation objects installed beside a track on which a vehicle of a track transport system mounted with an external sensor travels, the ground installation objects having two or more different sizes and being installed at a same predetermined location;
an installation object recognition unit that specifies the installation identifier from external sensor information including information detected by the external sensor and recognizes the ground installation object corresponding to the installation identifier by referring to the recording unit;

a detection distance calculation unit that calculates a detection distance of the external sensor; and a resolution calculation unit that calculates a resolution of the external sensor, the resolution being a minimum size of an object that can be detected by the external sensor, wherein the detection distance calculation unit calculates the detection distance of the external sensor from a self-position of the vehicle at which the ground installation object is recognized and the installation position of the ground installation object recognized by the installation object recognition unit, the detection distance being a maximum distance at which the ground installation object is recognized, the resolution calculation unit calculates the resolution of the external sensor on a basis of a size of the recognized ground installation object, and the detection distance calculation unit evaluates sensor performance of the external sensor by setting the calculated detection distance as an accuracy guarantee detection distance and setting the calculated resolution as an accuracy guarantee resolution of the external sensor.

2. The sensor performance evaluation system according to claim 1, wherein the resolution calculation unit includes, for the ground installation objects having different sizes, an index value associated with a size of a smallest recognizable ground installation object among the ground installation objects installed at one location or information associated with the resolution corresponding to each of cases including a case where a largest ground installation object is recognizable, but a smallest ground installation object is not recognizable, a case where even the smallest ground installation object is recognizable, and a case where even the largest ground installation object is not recognizable.

3. The sensor performance evaluation system according to claim 1, wherein the installation identifier of the ground installation object is a two-dimensional barcode.

4. The sensor performance evaluation system according to claim 1, wherein the installation identifier of the ground installation object is point cloud data.

5. The sensor performance evaluation system according to claim 1, wherein in a case where a plurality of the external sensors are mounted, the detection distance calculation unit adopts a minimum value of the detection distances obtained from the external sensors.

6. The sensor performance evaluation system according to claim 1, further comprising:

a speed limit determination unit that determines a speed limit based on the calculated detection distance; and a speed limit observation unit that outputs the speed limit determined by the speed limit determination unit.

7. An automatic driving system comprising:

the sensor performance evaluation system according to claim 6; and an automatic driving unit that controls a traveling speed within a range not exceeding the speed limit determined by the speed limit determination unit.

8. A sensor performance evaluation method comprising:

specifying an installation identifier from external sensor information including information detected by an external sensor mounted on a vehicle of a track transport system;

recognizing a ground installation object corresponding to the specified installation identifier by referring to a recording unit that records an installation position of the ground installation object and the installation identifier of the ground installation object for each of a plurality of the ground installation objects installed beside a track on which the vehicle mounted with the external sensor travels, the ground installation objects having two or more different sizes and being installed at a same predetermined location;

calculating a detection distance of the external sensor from a self-position of the vehicle at which the ground installation object is recognized and the installation position of the recognized ground installation object, the detection distance being a maximum distance at which the ground installation object is recognized;

calculating the resolution of the external sensor on a basis of a size of the recognized ground installation object, the resolution being a minimum size of an object that can be detected by the external sensor; and evaluating sensor performance of the external sensor by setting the calculated detection distance as an accuracy guarantee detection distance and setting the calculated resolution as an accuracy guarantee resolution of the external sensor.

\* \* \* \* \*